US010205703B2

United States Patent
Zhou et al.

(10) Patent No.: US 10,205,703 B2
(45) Date of Patent: *Feb. 12, 2019

(54) CONTEXT-AWARE DISTRIBUTED FIREWALL

(71) Applicant: Nicira, Inc., Palo Alto, CA (US)

(72) Inventors: Jingmin Zhou, San Jose, CA (US); Anirban Sengupta, Saratoga, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/633,384

(22) Filed: Jun. 26, 2017

(65) Prior Publication Data

US 2017/0366504 A1 Dec. 21, 2017

Related U.S. Application Data

(63) Continuation of application No. 14/558,561, filed on Dec. 2, 2014, now Pat. No. 9,692,727.

(51) Int. Cl.
*H04L 29/06* (2006.01)
*H04L 12/753* (2013.01)
*G06F 9/455* (2018.01)

(52) U.S. Cl.
CPC ...... *H04L 63/0227* (2013.01); *G06F 9/45533* (2013.01); *G06F 9/45558* (2013.01);
(Continued)

(58) Field of Classification Search
CPC . H04L 63/0227; H04L 63/0263; H04L 45/48; G06F 9/45533
See application file for complete search history.

(56) References Cited

U.S. PATENT DOCUMENTS 6,496,935 B1  12/2002  Fink et al.
6,880,089 B1   4/2005  Bommareddy et al.
(Continued)

FOREIGN PATENT DOCUMENTS

EP  2748750   7/2014
EP  3228060  10/2017
(Continued)

OTHER PUBLICATIONS

Author Unknown, "AppLogic Features," Jul. 2007, 2 pages. 3TERA, Inc.
(Continued)

*Primary Examiner* — Joseph P Hirl
*Assistant Examiner* — Stephen T Gundry
(74) *Attorney, Agent, or Firm* — Adeli LLP

(57) ABSTRACT

A context-aware distributed firewall scheme is provided. A firewall engine tasked to provide firewall protection for a set of network addresses applies a reduced set of firewall rules that are relevant to the set of addresses associated with the machine. A hypervisor implements a search structure that allows each virtual machine's filter to quickly identify relevant rules from all of the received rules. The search structure is constructed as a binary prefix tree, each node corresponding to an IP CIDR (Classless Inter-Domain Routing) block. A query for relevant rules traverses nodes of the search structure according to a queried IP address and collect all rules that are associated with the traversed nodes.

16 Claims, 12 Drawing Sheets

(52) U.S. Cl.
CPC .......... *H04L 45/48* (2013.01); *H04L 63/0263* (2013.01); *G06F 2009/45587* (2013.01); *G06F 2009/45595* (2013.01)

(56) References Cited

U.S. PATENT DOCUMENTS

| | | | |
|---|---|---|---|
| 7,055,173 | B1 | 5/2006 | Chaganty et al. |
| 7,349,382 | B2 | 3/2008 | Marimuthu et al. |
| 7,818,452 | B2 | 10/2010 | Matthews et al. |
| 7,948,986 | B1 | 5/2011 | Ghosh et al. |
| 8,032,933 | B2 | 10/2011 | Turley et al. |
| 8,190,767 | B1 | 5/2012 | Maufer et al. |
| 8,352,391 | B1 * | 1/2013 | Kapadia .............. H04L 63/0263 370/392 |
| 8,365,294 | B2 | 1/2013 | Ross |
| 8,660,129 | B1 | 2/2014 | Brendel et al. |
| 9,015,823 | B2 | 4/2015 | Koponen et al. |
| 9,130,901 | B2 * | 9/2015 | Lee ..................... H04L 63/0218 |
| 9,215,210 | B2 * | 12/2015 | Raman ................ H04L 63/0272 |
| 9,268,855 | B2 * | 2/2016 | Goyal ................. H04L 63/0227 |
| 9,432,284 | B2 * | 8/2016 | Goyal .................... H04L 45/48 |
| 9,503,427 | B2 * | 11/2016 | Raman ................ H04L 63/0272 |
| 9,692,727 | B2 | 6/2017 | Zhou et al. |
| 2002/0016826 | A1 | 2/2002 | Johansson et al. |
| 2002/0023089 | A1 * | 2/2002 | Woo .................... H04L 43/0876 |
| 2003/0093481 | A1 | 5/2003 | Mitchell et al. |
| 2003/0123456 | A1 * | 7/2003 | Denz ....................... H04L 45/04 370/400 |
| 2004/0049701 | A1 | 3/2004 | Le Pennec et al. |
| 2005/0083937 | A1 * | 4/2005 | Lim ......................... H04L 45/08 370/392 |
| 2005/0198125 | A1 | 9/2005 | Macleod Beck et al. |
| 2006/0195896 | A1 | 8/2006 | Fulp et al. |
| 2007/0016946 | A1 | 1/2007 | Gouda et al. |
| 2007/0061492 | A1 | 3/2007 | van Riel |
| 2008/0072305 | A1 | 3/2008 | Casado et al. |
| 2008/0267177 | A1 | 10/2008 | Johnson et al. |
| 2008/0289028 | A1 | 11/2008 | Jansen et al. |
| 2008/0298274 | A1 | 12/2008 | Takashige et al. |
| 2009/0007251 | A1 | 1/2009 | Abzarian et al. |
| 2009/0129271 | A1 | 5/2009 | Ramankutty et al. |
| 2009/0150521 | A1 | 6/2009 | Tripathi |
| 2009/0235325 | A1 | 9/2009 | Dimitrakos et al. |
| 2009/0249470 | A1 | 10/2009 | Litvin et al. |
| 2009/0249472 | A1 | 10/2009 | Litvin et al. |
| 2009/0327781 | A1 | 12/2009 | Tripathi |
| 2010/0037311 | A1 | 2/2010 | Fie et al. |
| 2010/0100616 | A1 | 4/2010 | Bryson et al. |
| 2010/0115101 | A1 | 5/2010 | Lain et al. |
| 2010/0125667 | A1 | 5/2010 | Soundararajan |
| 2010/0257263 | A1 * | 10/2010 | Casado ................... H04L 49/00 709/223 |
| 2010/0333165 | A1 * | 12/2010 | Basak ................ H04L 63/0263 726/1 |
| 2011/0016467 | A1 | 1/2011 | Kane |
| 2011/0022695 | A1 | 1/2011 | Dalai et al. |
| 2011/0072486 | A1 | 3/2011 | Hadar et al. |
| 2011/0103259 | A1 | 5/2011 | Aybay et al. |
| 2011/0113467 | A1 | 5/2011 | Agarwal et al. |
| 2011/0219444 | A1 * | 9/2011 | Turley ................ H04L 63/0263 726/13 |
| 2011/0246637 | A1 | 10/2011 | Murakami |
| 2012/0198541 | A1 * | 8/2012 | Reeves .............. H04L 63/0227 726/13 |
| 2012/0240182 | A1 | 9/2012 | Narayanaswamy et al. |
| 2013/0007740 | A1 | 1/2013 | Kikuchi et al. |
| 2013/0019277 | A1 * | 1/2013 | Chang ................ H04L 63/0218 726/1 |
| 2013/0034106 | A1 | 2/2013 | Goyal et al. |
| 2013/0073743 | A1 | 3/2013 | Ramasamy et al. |
| 2013/0125120 | A1 | 5/2013 | Zhang et al. |
| 2013/0125230 | A1 * | 5/2013 | Koponen ............ H04L 41/0823 726/13 |
| 2013/0132531 | A1 * | 5/2013 | Koponen ............ H04L 41/0823 709/220 |
| 2013/0163594 | A1 | 6/2013 | Sharma et al. |
| 2013/0227097 | A1 | 8/2013 | Yasuda et al. |
| 2013/0227550 | A1 | 8/2013 | Weinstein et al. |
| 2013/0247034 | A1 * | 9/2013 | Messerli ............. G06F 9/45533 718/1 |
| 2013/0283263 | A1 * | 10/2013 | Elemary ............. G06F 9/45558 718/1 |
| 2013/0332983 | A1 | 12/2013 | Koorevaar et al. |
| 2014/0068602 | A1 | 3/2014 | Gember et al. |
| 2014/0115578 | A1 | 4/2014 | Cooper et al. |
| 2014/0195666 | A1 | 7/2014 | Dumitriu et al. |
| 2014/0208412 | A1 * | 7/2014 | Bray ...................... H04L 63/02 726/11 |
| 2014/0245423 | A1 * | 8/2014 | Lee .................... H04L 63/0218 726/12 |
| 2014/0281030 | A1 | 9/2014 | Cui et al. |
| 2014/0282854 | A1 | 9/2014 | Clark et al. |
| 2014/0282855 | A1 | 9/2014 | Clark et al. |
| 2015/0082417 | A1 | 3/2015 | Bhagwat et al. |
| 2015/0106489 | A1 * | 4/2015 | Duggirala ........... H04L 61/2503 709/222 |
| 2015/0139238 | A1 * | 5/2015 | Pourzandi ............... H04L 45/42 370/392 |
| 2015/0195194 | A1 * | 7/2015 | Goyal .................... H04L 45/48 370/256 |
| 2015/0195262 | A1 * | 7/2015 | Goyal ............... G06F 17/30864 726/4 |
| 2015/0201047 | A1 | 7/2015 | Goyal et al. |
| 2015/0237013 | A1 | 8/2015 | Bansal et al. |
| 2015/0237014 | A1 * | 8/2015 | Bansal ................ H04L 63/0263 726/13 |
| 2015/0237015 | A1 * | 8/2015 | Bansal ................ H04L 63/0263 726/13 |
| 2015/0281178 | A1 | 10/2015 | Raman et al. |
| 2015/0281179 | A1 * | 10/2015 | Raman ................ H04L 63/0272 726/11 |
| 2015/0281180 | A1 | 10/2015 | Raman et al. |
| 2015/0341318 | A1 * | 11/2015 | Lee .................... H04L 63/0218 726/11 |
| 2015/0358288 | A1 | 12/2015 | Jain et al. |
| 2015/0358290 | A1 * | 12/2015 | Jain .................... H04L 63/0263 711/108 |
| 2016/0094642 | A1 * | 3/2016 | Jain ........................ H04L 45/44 709/226 |
| 2016/0094643 | A1 * | 3/2016 | Jain ........................ H04L 45/44 709/226 |
| 2016/0285825 | A1 * | 9/2016 | Keohane ............. H04L 63/0245 |
| 2016/0285826 | A1 * | 9/2016 | Itskin ................. H04L 63/0236 |
| 2016/0285828 | A1 * | 9/2016 | Keohane ............. H04L 63/0245 |
| 2016/0285913 | A1 * | 9/2016 | Itskin ................. H04L 63/0236 |
| 2016/0294772 | A1 * | 10/2016 | Padmanabhan ..... H04L 63/0263 |
| 2016/0294776 | A1 * | 10/2016 | Sun .................... H04L 63/0227 |
| 2016/0294874 | A1 * | 10/2016 | Sun .................... H04L 63/0227 |
| 2016/0323245 | A1 | 11/2016 | Shieh et al. |
| 2016/0359697 | A1 * | 12/2016 | Scheib ................ H04L 63/1425 |
| 2016/0359740 | A1 * | 12/2016 | Parandehgheibi .. H04L 63/1425 |
| 2016/0359915 | A1 * | 12/2016 | Gupta .................... H04L 43/04 |
| 2017/0005986 | A1 * | 1/2017 | Bansal ................ H04L 63/0263 |
| 2017/0005987 | A1 * | 1/2017 | Masurekar ........ G06F 17/30557 |
| 2017/0005988 | A1 * | 1/2017 | Bansal ............. G06F 17/30557 |
| 2017/0026283 | A1 * | 1/2017 | Williams ................ H04L 45/64 |

FOREIGN PATENT DOCUMENTS

| | | |
|---|---|---|
| WO | 2008095010 A1 | 8/2008 |
| WO | 2013074828 A1 | 5/2013 |
| WO | 2013168053 A1 | 11/2013 |
| WO | 2016089441 A1 | 6/2016 |

OTHER PUBLICATIONS

Author Unknown, "Cisco Identity-Based Firewall Security," Month Unknown 2011, 2 pages, Cisco Systems, Inc.
Author Unknown, "Enabling Service Chaining on Cisco Nexus 1000V Series," Month Unknown 2012, 25 pages, Cisco.
Author Unknown, "Next-Generation Firewalls," Month Unknown 2013, 1 page, Palo Alto Networks.

(56) References Cited

OTHER PUBLICATIONS

Basak, Debashis, et al., "Virtualizing Networking and Security in the Cloud," Month Unknown 2010, 9 pages, VMware, Inc., Palo Alto, California, USA.

Casado, Martin, et al., "SANE: A Protection Architecture for Enterprise Networks," Proceedings of the 15th USENIX Security Symposium, Jul. 31, 2006, 15 pages.

Dixon, Colin, et al., "An End to the Middle," Proceedings of the 12th conference on Hot topics in operating systems USENIX Association, May, 2009, pp. 1-5, Berkeley, CA, USA.

Dumitriu, Dan Mihai, et al., (U.S. Appl. No. 61/514,990), filed Aug. 4, 2011.

Guichard, J., et al., "Network Service Chaining Problem Statement," draft-quinn-nsc-probiem-statement-00.txt, Jun. 13, 2013, 14 pages, Cisco Systems, Inc.

Ioannidis, Sotiris, et al., "Implementing a Distributed Firewall," CCS'00, Month Unknown, 2000, 10 pages, ACM, Athens, Greece.

Joseph, Dilip Antony, et al., "A Policy-aware Switching Layer for Data Centers," Jun. 24, 2008, 26 pages, Electrical Engineering and Computer Sciences, University of California, Berkeley, CA, USA.

Neji, Nizar Ben, et al., "Towards Safe and Optimal Filtering Rule Reordering for Complex Packet Filters," 2011 5th International Conference on Network and System Security (NSS), Sep. 6, 2011, 8 pages, IEEE, Milan, Italy.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," SIGCOMM '12, Aug. 13-17, 2012, 12 pages, ACM, Helsinki, Finland.

Stojanovski, Nenad, et al., "Analysis of Identity Based Firewall Systems," Jan. 2010, 9 pages.

Stojanovski, Nenad, et al., "Architecture of a Identity Based Firewall System," International Journal of Network Security & Its Applications, Jul. 2011, 9 pages, vol. 3, No. 4.

\* cited by examiner

CONTEXT-AWARE DISTRIBUTED FIREWALL

CLAIM OF BENEFIT TO PRIOR APPLICATION

This application is a continuation application of U.S. patent application Ser. No. 14/558,561, filed Dec. 2, 2014, now published as U.S. Patent Publication 2016/0156591. U.S. Patent Publication 2016/0156591 is incorporated herein by reference.

BACKGROUND

In a Software Defined Datacenter (SDDC) environment, distributed network firewall is replacing traditional firewall in order to meet new requirements of granularity and scalability. Typically, a firewall controller is deployed on each hypervisor to protect the virtual machines (VMs) running on the hypervisor, and a centralized management component distributes firewall rules to all firewall controllers in the SDDC. Often, every firewall controller receives a large set of rules targeting at the entire datacenter. The firewall controller then applies all the rules to every protected VM in the datacenter. FIG. 1 illustrates a distributed firewall scheme in a datacenter 100 in which the complete set of firewall rules is applied to every VM. In this scenario, the large rule set can cause significant burden to firewall engine because every single network packet has to be inspected against the entire rule set. In addition, it also consumes large amount of memory because the rule set is replicated to every protected VM.

SUMMARY

Some embodiments of the invention provides a context-aware distributed firewall scheme in which a firewall engine tasked to provide firewall protection for a set of network addresses applies a reduced set of firewall rules that are relevant to the set of addresses associated with the machine. In some embodiments, firewall controllers are implemented by hypervisors or virtualization software running on host machines, and the network addresses protected by the firewall controllers correspond to the network addresses of the VMs being hosted by the hypervisors. Some or all of these firewall controllers are part of the hypervisors that allow host machines to operate VMs. The firewall controllers in turn protect those VMs by providing rules that are relevant to the network addresses of these VMs.

In some embodiments, each host machine receives firewall configuration messages regarding all rules in the datacenter. However, the hypervisor/firewall controller of the host machine identifies only the relevant rules for each of its VMs such that the hypervisor would only have to apply the identified relevant rules to check against the incoming packets. In some embodiments, the hypervisor implements a search structure that allows each VM's filter to quickly identify the relevant rules from all of the received rules.

In some embodiments, the search structure is for identification of qualifying rules (rules specified by IP CIDR blocks) that are relevant to a VM or a set of VMs. Each node of the search structure corresponds to an IP CIDR block. A rule is associated with a node if the rule's source or destination address field specifies the node's IP CIDR block. If multiple rules specify the same IP CIDR block in their address fields, the node that corresponds to the IP CIDR block would be associated with the multiple rules. In some embodiments, the search structure is constructed as a binary prefix tree.

To use the search structure for identifying the relevant rules for a VM, some embodiments uses the IP address of the VM to query the search structure. The query traverses nodes of the search structure and collect all rules that are associated with the traversed nodes. A node in the search structure will be traversed if (i) its CIDR block encompasses the queried IP address and (ii) all of its ancestor nodes are also traversed.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provides a context-aware distributed firewall scheme in which a firewall engine tasked to provide firewall protection for a set of network addresses apply a reduced set of firewall rules that are relevant to the set of addresses associated with the machine. For some embodiments, this invention solves the challenges caused by large rule set by reducing the rules being loaded on each VM based on network addresses of the VM. In some embodiments, the network addresses of a VM are used to determine all relevant firewall rules for the VM.

In some embodiments, when a VM is connected to the network, it presents itself with one or more valid network addresses in order to participate in network communication. The hypervisor detects the network addresses of the VM, then identifies firewall rules whose defined network addresses are a superset of the VM's network addresses. These identified rules are the firewall rules that are relevant to the VM. These rules are applied to the VM, and the firewall engine would use only these rules to inspect the network traffic of the VM. Typically, the total number of firewall rules for a datacenter can be quite big, from the range of tens of thousands to a hundred of thousands. However, the number of firewall rules for a single VM is quite small, no more than a hundred. Thus, distributed firewall based on the reduced, relevant rule set can achieve significant savings in memory and in processing time.

In some embodiments, a firewall engine in a hypervisor stores the network addresses of all firewall rules in a trie-like data structure. After detecting the network addresses of a new VM, the firewall engine looks up the rule trie and finds all rules whose addresses are a superset of the VM's network addresses. It then applies these rules to the VM. The firewall engine will use only the rules attached to the VM to inspect network traffic for that VM.

Several more detailed embodiments of the invention are described below. Section I describes system architecture for implementing the context-aware distributed firewall scheme. Section II describes a search structure that facilitates the identification of relevant rules for a local firewall controller. Section III describes an example computing device that serve as a host machine of VMs. Finally, section IV describes an electronic system with which some embodiments of the invention are implemented.

I. Architecture

Figure 2:
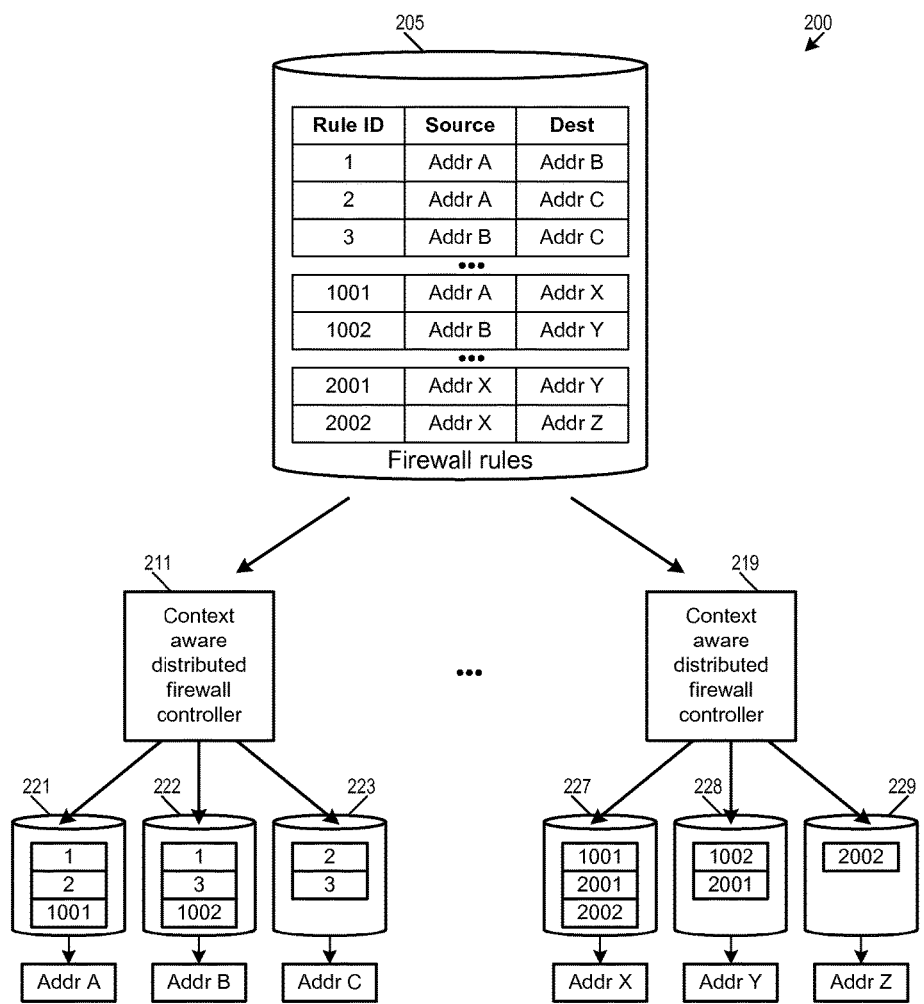
FIG. 2 illustrates a distributed firewall architecture in which each distributed firewall controller uses only a reduced, relevant rule set for the network addresses that it is protecting.

FIG. 2 illustrates a distributed firewall architecture in which each distributed firewall controller uses only a reduced, relevant rule set for the network addresses that it is protecting. Some embodiments refer to these distributed firewall controllers as being context aware, because each of these firewall controllers is aware of the network addresses that it has to protect and in turn use only the rule sets that are relevant to the network addresses that it is aware of.

The figure illustrates a datacenter 200 that implements a distributed firewall scheme. As illustrated, the datacenter 200 employs multiple distributed (or local) firewall controllers 211-219. Each of these firewall controllers is tasked to protect one or more network addresses (i.e., the network node that are associated with these network addresses). As illustrated, the firewall controller 211 is tasked to protect network addresses A, B, and C and the firewall controller 219 is tasked to protect network addresses X, Y, and Z.

The datacenter 200 has a complete set of firewall rules 205. Each rule has a source field and a destination field. Each source/destination field specifies a network address, a range of network addresses (such as a CIDR block), or collection of network addresses (such as a container). A packet having a source address and a destination address that respectively falls within the source field and the destination field of a rule is subject to the specified action/requirement of the rule.

Figure 1:
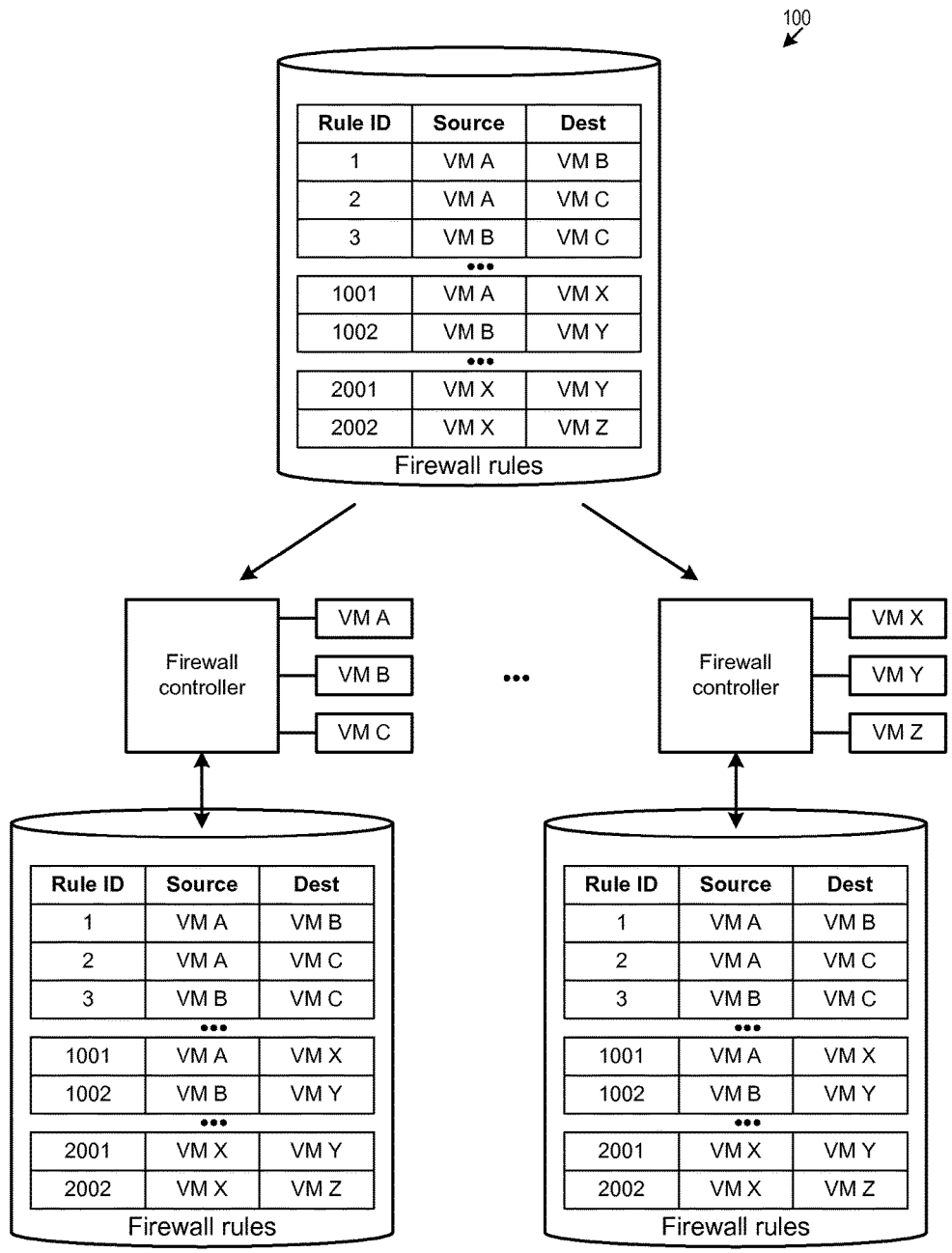
FIG. 1 illustrates a distributed firewall scheme in a datacenter in which the complete set of firewall rules is applied to every VM.

These rules are for protecting all network addresses in the datacenter 200 (e.g., all VMs running on all host machines of the datacenter). As illustrated, some of the rules are applicable to the addresses protected by the firewall controller 211 (addresses A, B, and C are protected by rules 1, 2, 3, 1001, and 1002), while some of the rules are applicable to the addresses protected by the firewall controller 219 (addresses X, Y, and Z are protected by rules 1001, 1002, 2001, and 2002). However, unlike the distributed firewall scheme of FIG. 1 in which each firewall controller has to inspect the entire rule set of the datacenter 100, each firewall controller in the datacenter 200 of FIG. 2 is context-aware and only inspects a relevant subset of the rule set 205 for the network addresses that it is protecting.

As illustrated, the context-aware firewall controller 211 provides only subsets 221, 222, and 223 of the rules for addresses A, B, and C respectively, Consequently, the firewall of address A inspects only rules 1, 2, and 1001, the firewall of address B inspects only rules 1, 3, and 1002, the firewall of address C inspects only 2 and 3, etc. Likewise, the context-aware firewall controller 219 provides only subsets 227, 228, and 229 of the rules for addresses X, Y, and Z respectively. Consequently, the firewall of address X inspects only rules 1001, 2001, and 2002, the firewall of address Y inspects only rules 1002 and 2001, the firewall of address Z inspects only rules 2002, etc.

In some embodiments, the firewall controllers 211-219 are implemented by hypervisors or virtualization software running on host machines, and the network addresses protected by the firewall controllers correspond to the network addresses of the VMs being hosted by the hypervisors. Some or all of these firewall controllers part of the hypervisors that allow host machines to operate VMs. The firewall controllers in turn protect those VMs by providing rules that are relevant to the network addresses of these VMs. For some embodiments, FIG. 3 illustrates context-aware firewall controllers that are implemented in hypervisors for protecting the VMs that are operating on those hypervisors.

Figure 3:
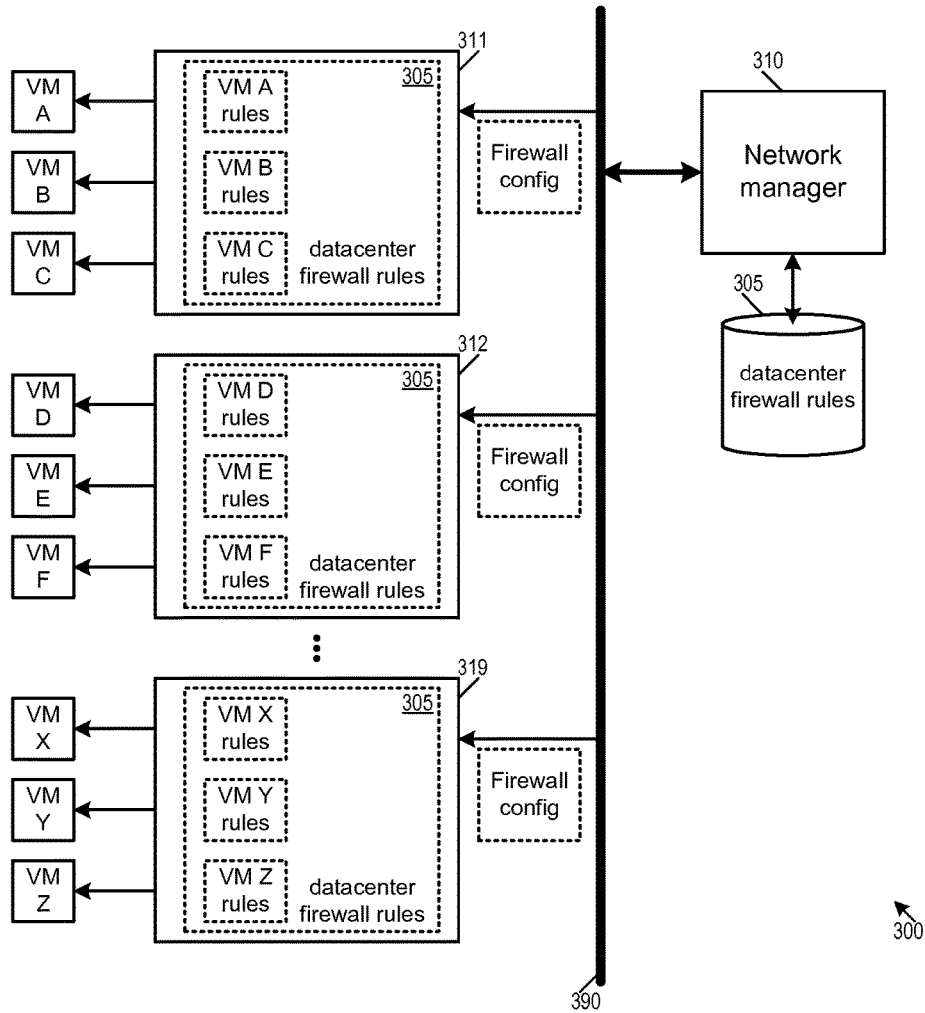
FIG. 3 illustrates context-aware firewall controllers that are implemented in hypervisors for protecting the VMs that are operating on those hypervisors.

FIG. 3 illustrates a datacenter 300 that has a set of centralized firewall rules 305 for protecting the entire datacenter. The centralized firewall rules 305 are maintained by a network manager 310 of the datacenter 300. Several host machines 311-319 are situated in the datacenter 300. The network manager 310 and the host machines 311-319 are interconnected by a physical network infrastructure 390, which allows the network manager to send control plane messages to each of the host machines, including firewall configuration messages. The host machines 311-319 in the datacenter 300 operate VMs A through Z, and the centralized firewall rules 305 includes rules for protecting all of those VMs.

Each host machine is operating hypervisor or virtualization software that allows the host machine to host one or more VMs. As illustrated, the host machine 311 is hosting VMs A, B, and C, the host machine 312 is hosting VMs D, E, and F, and the host machine 319 is hosting VMs X, Y, and Z. The virtualization software of each host machine also operates a (local copy of) distributed firewall controller for protecting the VMs that it is hosting. Each hypervisor performs firewall operation for each of its VMs based on a reduced set of rules that is relevant to the VM. For example, the virtualization software of the host machine 311 only use firewall rules that are relevant to VM A for VM A, firewall rules that are relevant to VM B for VM B, etc. By not having to search through irrelevant firewall rules, each hypervisor-implemented distributed firewall controller is able to achieve significant savings in packet processing time and memory usage.

Different embodiments use different methods for ensuring that the only the relevant rules are considered by each distributed firewall controller. In some other embodiments, the network manager of the datacenter learns which VMs are being protected by a particular distributed firewall controller. The network manager then identifies the relevant rules for those VMs and sends firewall configuration messages containing only the identified relevant rules to the particular distributed firewall controller. Each host machine therefore only stores the relevant rules for the VMs that it is hosting.

Figure 4:
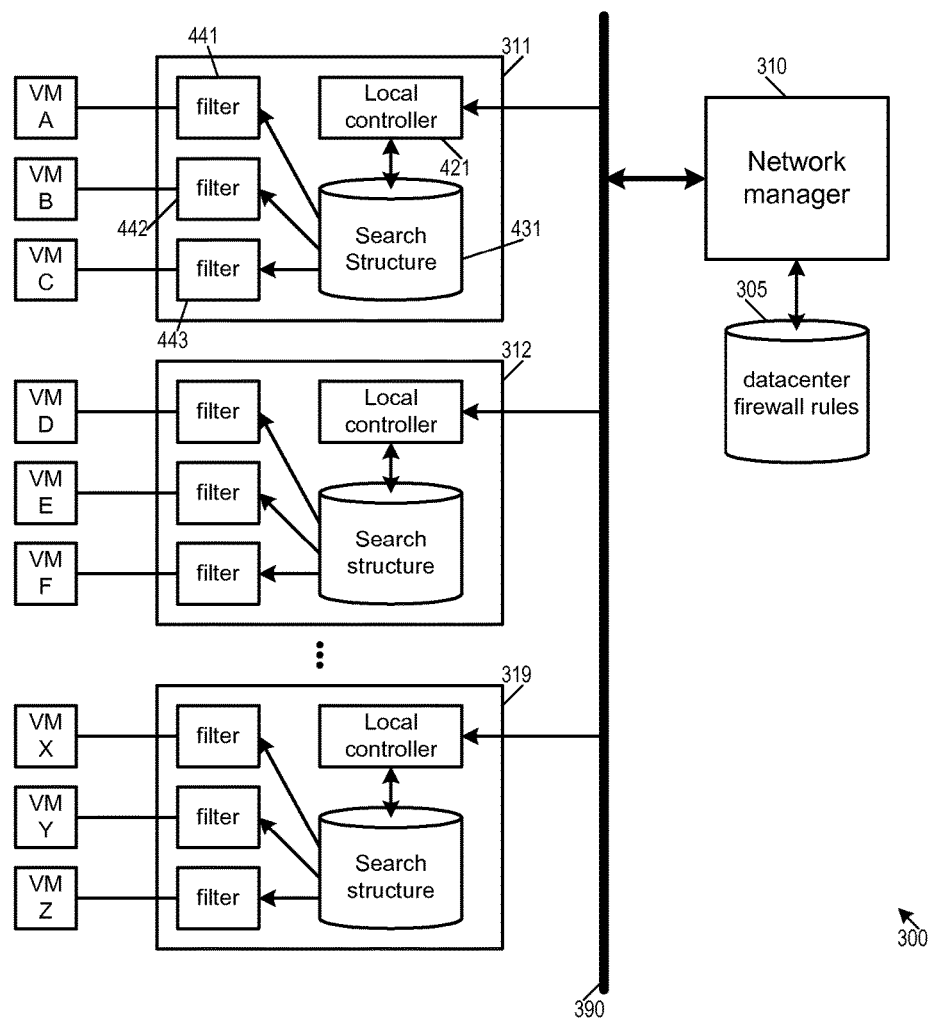
FIG. 4 illustrates a hypervisor that receive the complete set of firewall rules from a network manager and identifies rules that are relevant to each VMs of the hypervisor.

In some embodiments, each host machine receives firewall configuration messages regarding all rules in the datacenter. As illustrated in FIG. 3, each host machine 311-319 receives all rules in the datacenter firewall rules 305 from the network manager 310. However, the hypervisor/firewall controller of the host machine identifies only the relevant rules for each of its VMs such that the hypervisor would only have to apply the identified relevant rules to check against the incoming packets. FIG. 4 illustrates a hypervisor that receive the complete set of firewall rules from a network manager and identifies rules that are relevant to each VMs of the hypervisor.

As illustrated, the hypervisor for each host machine in the datacenter 300 includes a local firewall controller, a search structure, and a set of filters for its VMs. For example, the host machine 311 runs a hypervisor that includes a local firewall controller 421, a search structure 431, and a set filters 441-443 for its VMs A, B, and C, respectively. The local firewall controller 421 receives control plane messages from the network manager 310. The control plane messages include the firewall rules for the entire datacenter. The local firewall controller 421 in turn uses the received firewall rules to construct the search structure 431 that includes the entire firewall rule set of the datacenter 300. Each filter of the hypervisor 311 (filters 441-443) in turn uses the search structure 431 to query the rules that are relevant to the IP addresses of its corresponding VM. The relevant rules of a VM being those whose source or destination addresses encompass or are identical to the IP address of the VM.

In some embodiments, a hypervisor creates a filter as a logical network introspection entity when a virtual NIC (network interface controller) of a protected VM is connected to a L2 virtual switch of the hypervisor. This filter contains a set of firewall rules and allows the firewall controller to inspect all network packets passing through the virtual NIC against the rules. After receiving a new firewall configuration message from the network manager, the hypervisor programs the filter of all protected VMs with new rules. Rather than passing all received rules to every applicable filter in the kernel, the hypervisor in some embodiments implements a search structure (such as the search structure 431 for the hypervisor 311) that allows each VM's filter to quickly identify the relevant rules from all of the received rules. Search structures for identifying relevant rules will be further described below in Section II.

Figure 5:
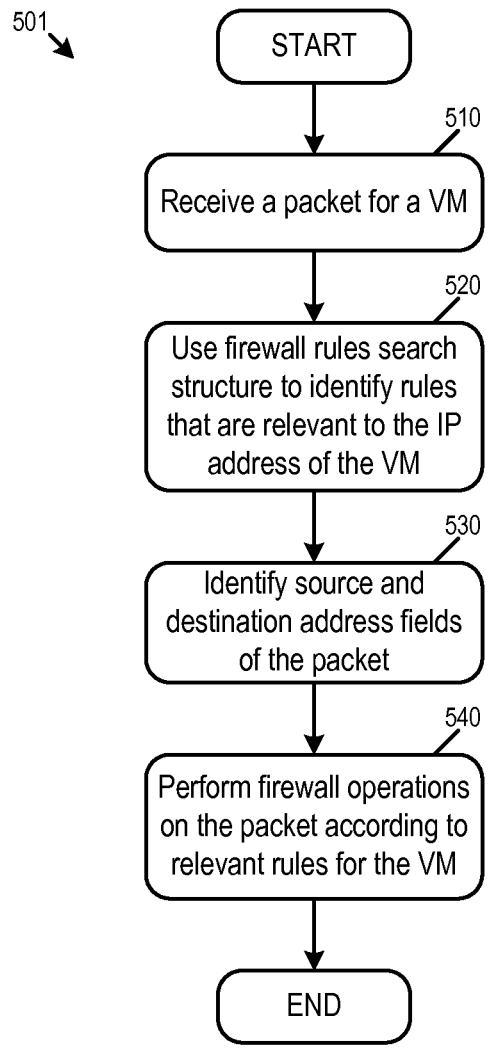
FIG. 5 conceptually illustrates a process for performing firewall filtering operations by identifying and applying only relevant rules.

FIG. 5 conceptually illustrates a process 500 for performing firewall filtering operations by identifying and applying only relevant rules. The process is performed by hypervisors running on host machines in some embodiments. Specifically, in some embodiments, the process 500 is performed by a filter module for a VM.

The process starts when it receives (at 510) a packet for the VM. The process then uses (at 520) the firewall rules search structure to identify rules that are relevant to the VM based on the IP address of the VM. In some embodiments, the filter caches the relevant rules and only uses the firewall rules search structure to update its cached rules when the firewall rules have been updated, e.g., when the hypervisor receives a firewall configuration message from the network controller.

The process then identifies (at 530) the source and destination address fields of the received packet and perform (at 540) firewall operations on the incoming packet (e.g., to block, to allow, etc.) by applying the relevant rules of VM. In some embodiments, the process goes through the relevant rules and applies those having source and destination fields that respectively encompass the source and destination fields of the incoming packet. The process 500 then ends.

II. Search Structure

As mentioned, an address field of a firewall rule can specify a network address, a range of network addresses, or collection of network addresses. Different embodiments use different types of search structures that are optimized toward different types of address fields. For example, some embodiments use container-based search structures that are optimized toward address fields that are specified as containers of network addresses. U.S. patent application Ser. No. 14/295,553 titled "Efficient Packet Classification for Dynamic Containers" filed on Jun. 4, 2014, now issued as U.S. Pat. No. 9,774,707, describes a search structure for rules that use containers to specify source and/or destination addresses. U.S. patent application Ser. No. 14/295,553, now issued as U.S. Pat. No. 9,774,707, is hereby incorporated by reference.

In some embodiments, the firewall rules use IP CIDR blocks to specify the source and destination addresses, and the local firewall controllers in the hypervisors use search structures that are optimized for finding relevant rules among rules that use IP CIDR blocks to specify source and destination addresses. CIDR (Classless Inter-Domain Routing) notation is a compact representation of an IP address and its associated routing prefix. The notation is constructed from the IP address and the prefix size, the latter being equivalent to the number of leading 1 bits in the routing prefix mask. The IP address is expressed according to the standards of IPv4 or IPv6. It is followed by a separator character, the slash ('/') character, and the prefix size expressed as a decimal number. The address may denote a single, distinct interface address or the beginning address of an entire network. For example, the IP CIDR block 192.168.100.0/24 specifies a routing prefix 192.168.100.0 and a subnet mask 255.255.255.0 (i.e., 24 leading 1-bits). In other words, the notation 192.168.100.0/24 represents a subnet that includes a range of address from 192.168.100.0 through 192.168.100.255. For some embodiments, an individual IP address can be regarded as a/32 CIDR block (i.e., having 1-bits for the entire subnet mask).

In some embodiments, a rule is regarded as being irrelevant to a VM if both source and destination addresses of the rule is defined as IP CIDR blocks but the IP address of the VM does not fall in either IP CIDR blocks. Any IP packet from or to the VM will not match the irrelevant rule because both the source and destination addresses of the packet will not match that of the rule. Conversely, if the IP address of a VM falls in either source or destination IP CIDR block of a rule, the rule is relevant to the VM and thus has to be used to examine packets from or to the VM. The local firewall controller in some embodiments therefore finds all rules that are relevant to a VM based on this criterion.

Some embodiments classify firewall rules into two categories: qualified rules and non-qualified rules. If both source and destination address of a rule are defined as IP CIDR blocks (or a set of IP CIDR blocks), and the IP CIDR blocks are neither broadcasting nor multicasting addresses, the rule is qualified. All other rules are non-qualified rules. Non-qualified rules typically fall into the following categories:

Either or both addresses of the rule are not defined, meaning they are wild-card address.
Either or both addresses of the rule have negation flag.
Either or both addresses of the rule are broadcasting or multicasting address.
Either or both addresses of the rule is non-IP address.

In some embodiments, all non-qualified rules are used by a local firewall controller of the hypervisor regardless of IP addresses of the protected VMs. In other words, the local firewall controller in some embodiments considers all non-qualified rules as relevant rules regardless of the IP addresses of the VMs that are being protected. However, a firewall system typically has far more qualified rules than non-qualified rules. A local firewall controller in some embodiments therefore uses a search structure for efficiently finding the relevant rules that are qualified.

Figure 6:
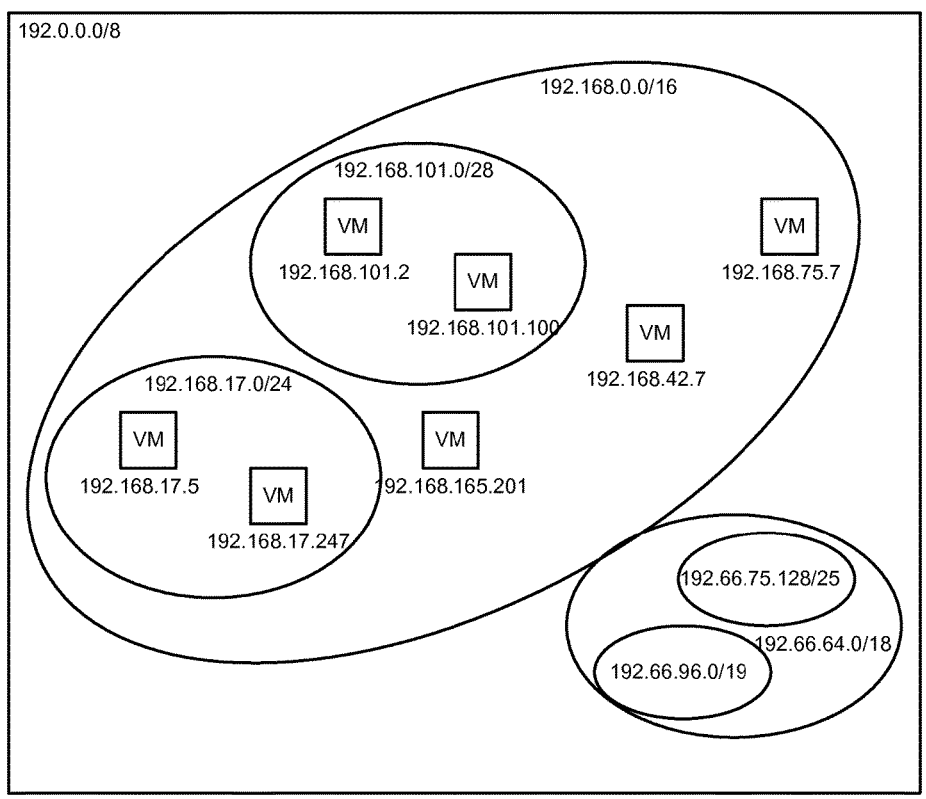
FIG. 6 illustrates a firewall rule in which each rule has only IP CIDR blocks as source and destination addresses.

FIG. 6 illustrates an example firewall rule set 600. The firewall rule set 600 includes qualified rules 601-608 (rules with IDs 1 through 8) that each has only IP CIDR blocks as source and destination addresses. For example, the rule 601 specifies the IP CIDR block 192.168.17.0/24 as its source address and the CIDR block 192.168.101.0/28 as its destination address. The rule 606 specifies IP addresses 192.168.17.5 and 192.168.17.247 as source address and destination address respectively, but these are equivalent to CIDR blocks having 32 1's in its subnet mask (i.e., 192.168.17.5/32 and 192.168.17.247/32).

The IP CIDR blocks of the firewall rule sets 600 all belong to a subnet 192.0.0.0/8. The IP CIDR blocks used by the rules in the qualified rule sets are subsets or subnets of 192.0.0.0/8. FIG. 6 also conceptually illustrates the logical relationships between the some of the different IP CIDRs specified by the rules in the set 600. For example, the VM 192.168.101.2 is in a subnet 192.168.101.0/28, which is the IP CIDR used by the rule 601, 605, and 607. The subnet 192.168.101.0/28 is in turn a subset of the subnet 192.168.0.0/16, which is used by the rule 602. Consequently, the rules 601, 602, 605, and 607 are the relevant qualifying firewall rules for the VM having IP address 192.168.101.2.

Figure 7:
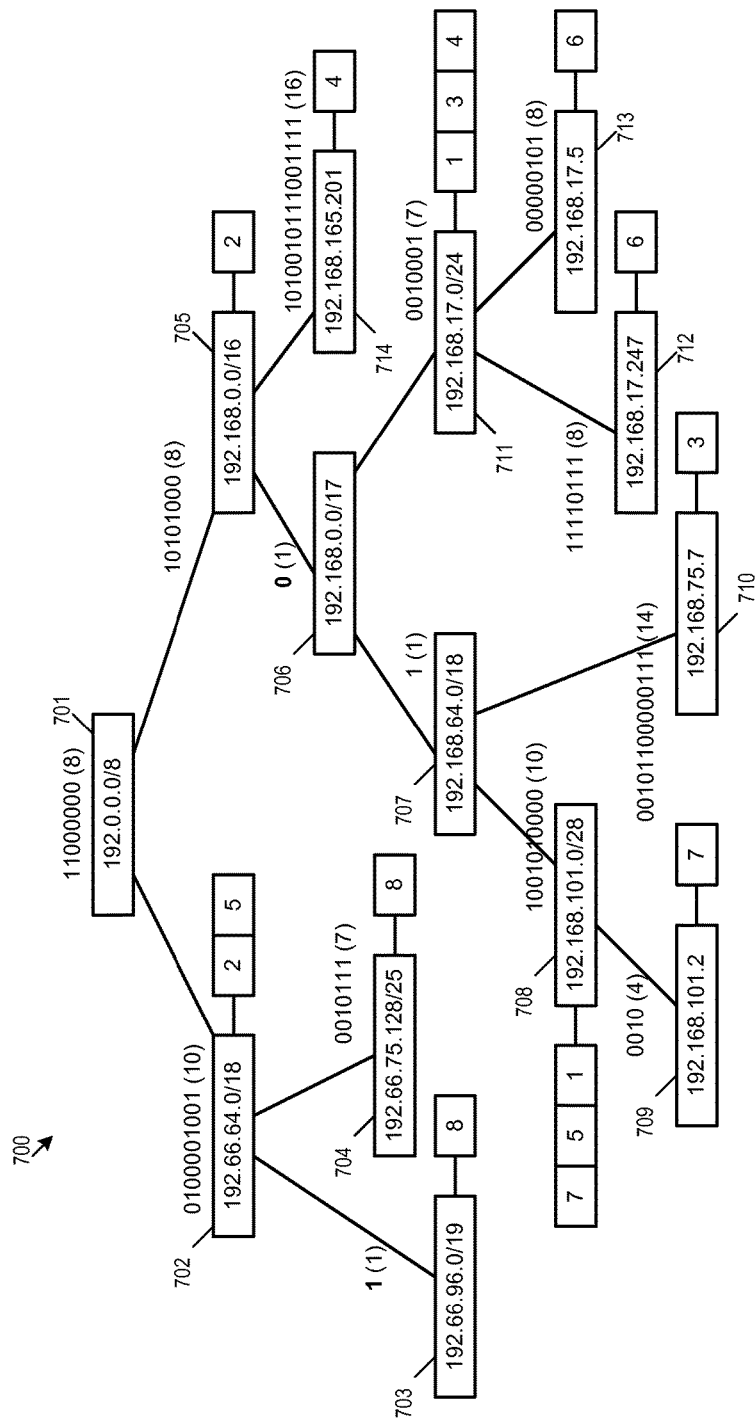
FIG. 7 illustrates a search structure for efficiently identifying relevant rules from the qualified rules in the set.

FIG. 7 illustrates a search structure 700 for efficiently identifying relevant rules from the qualified rules in the set 600. The search structure 700 includes nodes 701-714. Each node corresponds to an IP CIDR block. A rule is associated with a node if the rule's source or destination address field specifies the node's IP CIDR block. If two (or more) rules both specifies the same IP CIDR block in their address fields, the node that corresponds to the IP CIDR block would be associated with both rules (e.g., by a linked list that includes both rules). For example, the rules 601 (rule ID 1), 605 (rule ID 5), and 607 (rule ID 7) all specify the IP CIDR block 192.168.101.0/28 as a source or destination address. In the prefix tree 700, the node 708 corresponds to the IP CIDR block 192.168.101.0/28, and thus the node 708 is associated with the rules with IDs 1, 5, and 7. As illustrated, the nodes 702, 703, 704, 705, 708, 710, 711, 712, 713, and 714 are all nodes that are associated with one or more qualified rules from the set 600.

The search structure 700 is constructed as a binary prefix tree or trie (i.e., a Patricia tree with radix 2), in which each node has at most two child nodes. In some embodiments, the CIDR block of each child node is a subnet of the CIDR of the parent node. For example, the node 707 and 711 are child nodes of the node 706. The CIDR block of the node 707 (192.168.64.0/18) and the CIDR block of the node 711 (192.168.17.0/24) are both subnets encompassed by the CIDR block of the node 706 (192.168.0.0/17). Consequently, any node in the search tree 700 corresponds to a IP CIDR block that encompass all of IP CIR blocks of its offspring nodes (e.g., the CIDR block (192.0.0.0/8) of the root node 701 encompasses the CIDR blocks of all other nodes 702-713 in the prefix tree.)

In some embodiments, the IP CIDR block of each node can be expressed as a prefix binary string whose length is determined by the '/' notation. For example, the CIDR 192.168.0.0/17 of the node 706 can be expressed as a 17 bit long prefix binary string 11000000101010000. Each child node of the node can in turn be arrived at by appending the prefix string of the parent node with a suffix substring. For example, the CIDR of the node 707 (192.168.64.0/18) can be arrived at by appending a 1-bit suffix substring '1' to the prefix string of the parent node 706 (i.e., 11000000101010000_1). The CIDR of the other child node 711 (192.168.17.0/24) can be arrived at by appending a 7-bit suffix substring '0010001' to the prefix binary string of the parent node 706 (i.e., 11000000101010000_0010001). The appended string for a child node in turns becomes the prefix binary string of the child node, which in turn can append a suffix substring to arrive at a prefix string of a grand-child node, and so forth. Consequently, except for the root node 701, every node in the search tree 700 is associated with a suffix substring. For example, the node 701 is associated with a 8-bit suffix substring 1100000, the node 705 is associated with a 8-bit suffix substring 10101000, the node 706 is associated with 1-bit suffix substring 0, the node 711 is associated with a 7-bit suffix substring 0010001, and the node 712 is associated with a 8-bit suffix substring 11110111. The binary string or the CIDR block of each node can be derived by appending the suffix substrings of all of its ancestor nodes to the root node. For example, the CIDR block 192.168.17.247 of the node 712 is the appended result of all the suffix substrings of nodes 701, 705, 706, 711, and 712 (1100000_10101000_0_0010001_11110111).

For a node having two child nodes in the search tree, one child node is on a '1' path and the other child node is on a '0' path. More precisely, in some embodiments, one child node is associated with a suffix substring that starts with '0' and the other child node is associated with a suffix substring that starts with '1'. For example, the node 706 has a '1' child node 707 associated with the suffix substring '1' and a '0' child node 711 associated with the suffix substring '0010001'. When traversing the search tree for a particular IP address or CIDR block, the traversal would take the '1' path if the suffix string of the '1' path matches corresponding bits in the particular IP address or CIDR block. Likewise, the traversal would take the '0' path if the suffix string of the '0' path matches the corresponding bits of the particular IP address or CIDR block. If neither the '1' path or the '0' path has a matching suffix string for the IP address or CIDR block, the traversal terminates.

As mentioned, the search tree 700 is for facilitating the efficient identification of qualifying rules (rules specified by IP CIDR blocks) that are relevant to a VM or a set of VMs. To use the search tree for identifying the relevant rules for a VM, some embodiments uses the IP address of the VM to query the search tree. The query traverses nodes of the search tree and collect all rules that are associated with the traversed nodes. A node in the search tree will be traversed if (i) its CIDR block encompasses the queried IP address and (ii) all of its ancestor nodes are also traversed.

Figure 8:
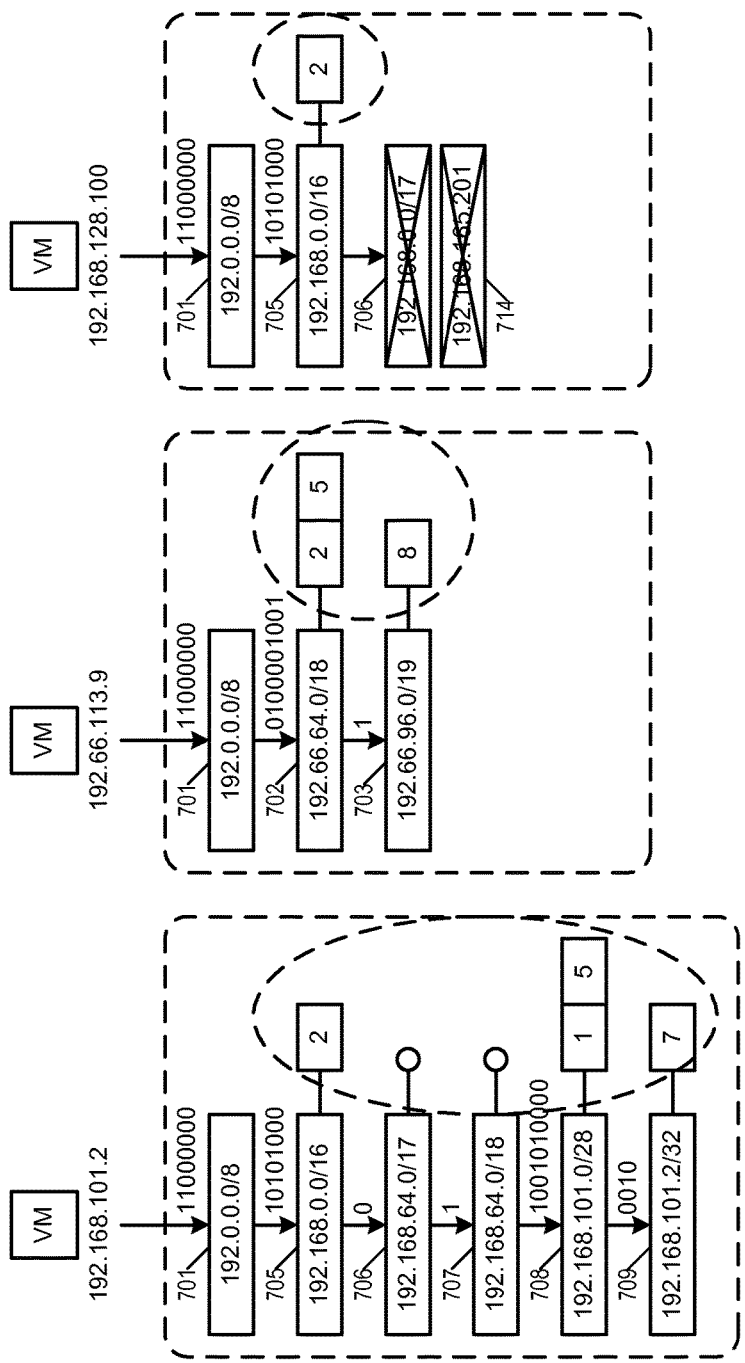
FIG. 8 illustrates using a search tree to identify relevant rules for several example IP addresses.

FIG. 8 illustrates using the search tree 700 to identify relevant rules for several example IP addresses. Each search or query is conducted for a VM based on the VM's IP address. The first example uses the prefix tree 700 for finding the relevant rules for IP address 192.168.101.2. The traversal follows the path of nodes 701, 705, 706, 707, 708, 709, as the IP address 192.168.101.2 (11000000101010000110010100000010) is parsed into binary substrings for determining the traversal path of the search tree. Specifically, the address is parsed into substrings (11000000_101010000_1_1001010000_0010) that match the suffix substrings of the traversed nodes 701, 705, 706, 707, 708, 709. Along the way, the rules associated with the traversed nodes 705, 708, and 709 (rules 2, 1, 5, 7) are collected and identified as the rules that relevant to the IP address 192.168.101.2. The traversal ends at the node 709 as it has no child node. The node 709 is also the last node having a CIDR block that encompasses the IP address being queried (the CIDR of the node 709 is identical to the queried IP address 192.168.101.2).

The second example uses the prefix tree 700 for finding the relevant rules for a VM with IP address 192.66.113.9. The traversal follows the path of nodes 701, 702, and 703, as the IP address 192.66.113.9 (11000000010000100111000100001001) is parsed into binary substrings for determining the traversal path of the search tree. Specifically, the most significant portions of the IP address (11000000_0100001001_1) is used for matching the suffix substrings of nodes 701, 702, and 703. Along the way, the rules associated with the nodes 702 and 703 (rules 2, 5, 8) are collected and identified as the rules that relevant to the IP address 192.66.113.9. The traversal ends at the node 703 as it has no child node. The node 703 is also the last node having a CIDR block that encompasses the IP address being queried (the subnet 192.66.96.0/19 encompasses the IP address 192.66.113.9).

The third example uses the prefix tree 700 for finding the relevant rules for IP address 192.168.128.100. The traversal follows the path of nodes 701 and 705, as the IP address 192.168.128.100 (11000000101010001000000001100100) is parsed into binary substrings for determining the traversal path of the search tree. Specifically, the most significant portions of the IP address (11000000_10101000) are used for matching the suffix substrings of nodes 701 and 705. Along the way, the rules associated with the node 705 (rule 2) are collected and identified as the rules that relevant to the IP address 192.168.128.100. The traversal ends at the node 705, because neither child nodes of the node 705 (706 and 714) can encompass the queried IP address (192.168.128.100 does not fall within 192.168.0.0/17 nor 192.168.165.201). This is also because the queried IP address 192.168.128.100 is not able to follow the '1' path or the '0' path of the node 705, since the suffix substrings of the corresponding child nodes do not match the corresponding bits in the IP address 192.168.128.100.

Figure 9:
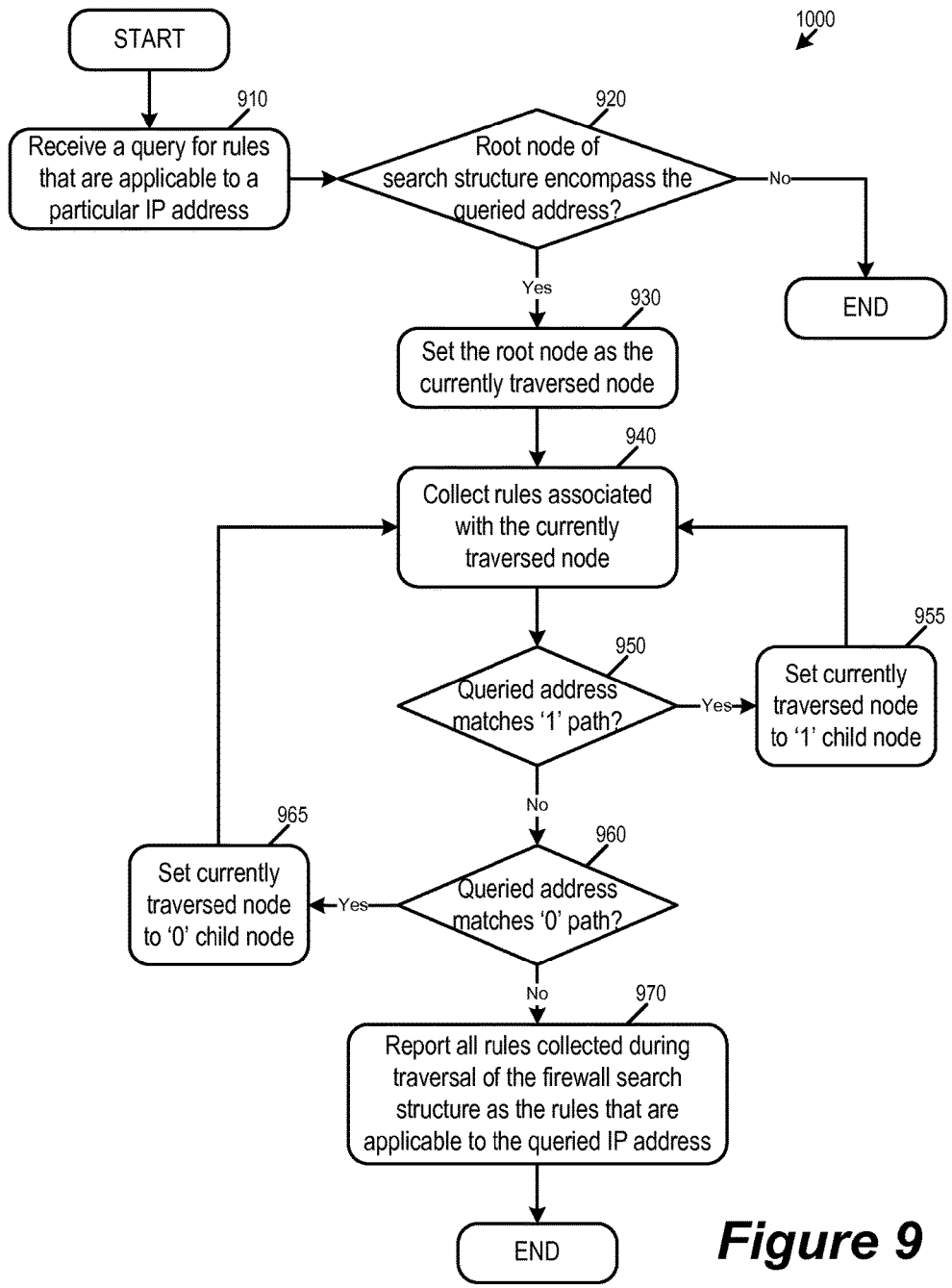
FIG. 9 conceptually illustrates a process for using a search tree of firewall rules to identify qualified rules relevant to an IP address.

For some embodiments, FIG. 9 conceptually illustrates a process 900 for using a search tree of firewall rules to identify qualified rules relevant to an IP address (non-qualified rules are treated as relevant in some embodiments). In some embodiments, the IP address is that of a VM running on a hypervisor of a host machine, and that the hypervisor performs the process 900 in order to identify the relevant rules for protecting the VM as part of its distributed firewall program. In some embodiments, a filter module for the VM performs the process 900 as part of the hypervisor. In some embodiments, the process is performed by a search structure management module in the hypervisor that receives queries for IP addresses and in turn produces relevant rules for queried IP addresses.

The process 900 starts when it receives (at 910) a query for relevant rules based on an IP address. In some embodiments, the process receives the IP address that serves as the basis of the relevant rule query. The process then determines (at 920) if the root node of the search structure encompass the queried IP address. If not, the process 900 terminates since no other nodes in the search can possibly encompass the queried IP address. If the root node does encompass the queried IP address, the process then sets (at 930) the root node as the currently traversed node and proceeds to 940.

At 940, the process collects the rules associated with the currently traversed node, if there are any. The process then determines (at 950) if the queried IP address is able to follow the '1' path to the '1' child node of the currently traversed node. If so, the process proceeds to 955. Otherwise, the process proceeds to 960 to determine if the IP address is able to follow the '0' path to the '0' child node of the currently traversed node. If so, the process proceeds to 965. Otherwise the process proceeds to 970.

At 955, the process sets the currently traversed node to the '1' child node and proceeds to 940. Conversely, at 965, the process sets the currently traversed node to the '0' child node and proceeds to 940. In some embodiments, the queried IP address is able to follow a path to a child node if the suffix substring of the child node matches the corresponding bits of the queried IP address. When the child node is traversed, it means that the child node's CIDR block encompasses the queried IP address.

At 970, the process has determined that the queried IP address is not able to traverse to a child node of the current node. In some embodiments, this is because neither child node encompasses the queried IP address, or because the current node has no child node. In either instance, the current node is the last node to correspond to a CIDR block that encompasses the queried IP address. The process therefore reports all rules collected during the traversal of the firewall search structure as the rules that are relevant or applicable to the queried IP address. The process 970 then ends. The querying entity (i.e., the hypervisor or the filter for the VM) then takes the reported rules as the relevant firewall rules (qualified rules) identified for protecting the VM.

Figure 10:
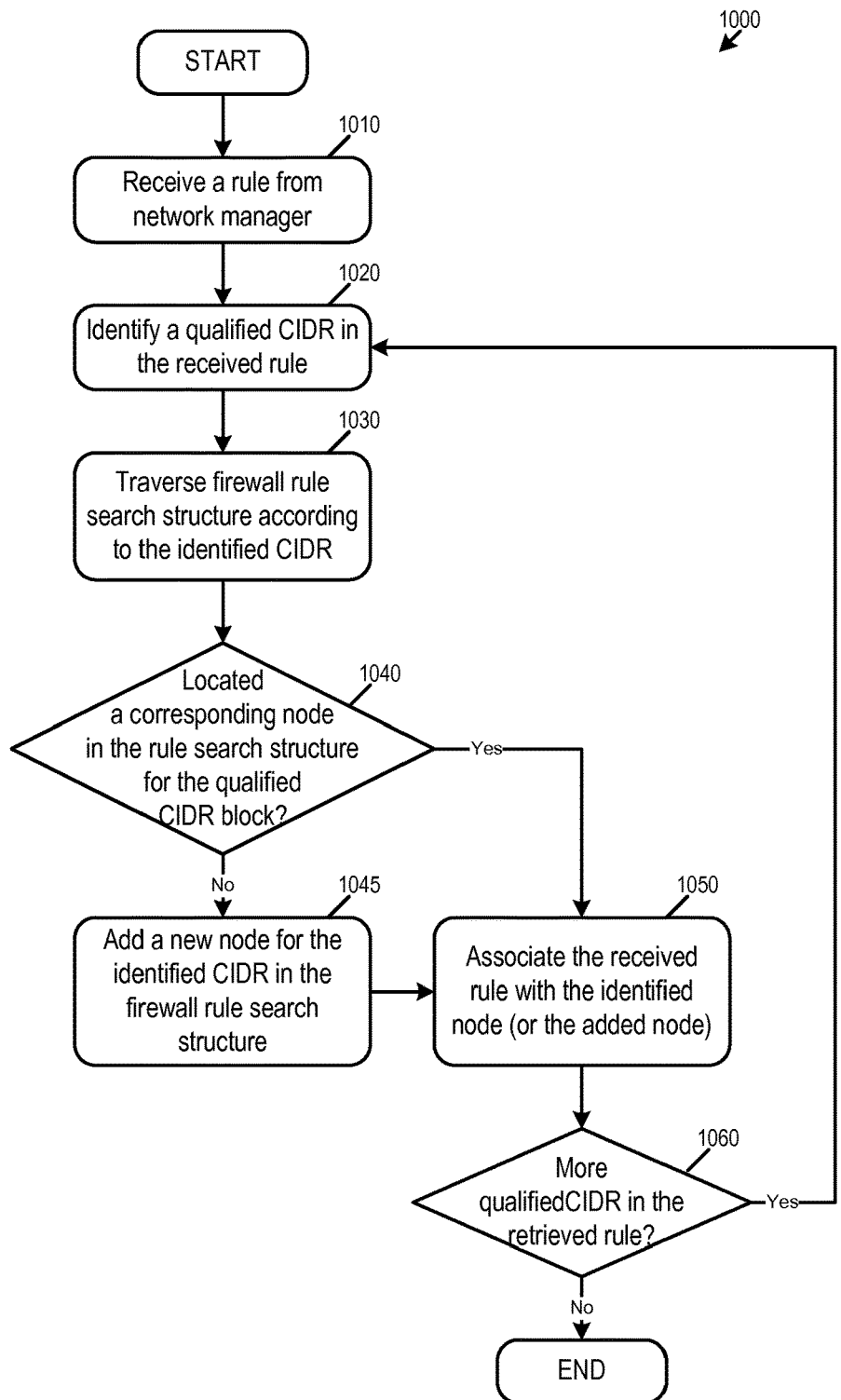
FIG. 10 conceptually illustrates a process for constructing and updating a prefix tree search structure for identifying relevant rules to a local firewall controller.

In some embodiments, a hypervisor constructs and updates the prefix tree search structure (such as the search tree 700) as it receives firewall configuration update messages from the network manager. The constructed tree is then provided to the filters of the VMs as the search structure for efficient identification of relevant rules. For some embodiments, FIG. 10 conceptually illustrates a process 1000 for constructing and updating a prefix tree search structure for identifying relevant rules to a local firewall controller. In some embodiments, the process 1000 is performed by the hypervisor that performs the local firewall controller. Some embodiments performs the process 1000 continuously to dynamically keep its search structure up-to-date such that the filters of the VMs would have access to the latest set of firewall rules.

The process starts when it receives (at 1010) a firewall rule from the network manager (e.g., 310). In some embodiments, the rule is part of a firewall configuration message that is received from the network manager. The process then identifies (at 1020) a qualified IP CIDR block in the received rule from the source address field and the destination address field.

The process then traverses (1030) the firewall rule search tree based on the rule's CIDR block. In some embodiments, this traversal is based on the binary string of the received rule's CIDR block (rather than on the binary string of the IP address of a protected VM as in the process 900), i.e., deciding whether to take the '0' path or the '1' path by comparing the substrings of the child nodes with corresponding bits in the rule's CIDR block, etc.

The process then determines (at 1040) if it is able to locate a node in the search structure for the rule's CIDR block from the traversal. Unlike the traversal for finding relevant rules in the process 900 in which the search is for identifying nodes with CIDR blocks that encompass the queried IP address, the traversal here in the process 1000 is for finding a node that matches exactly the rule's CIDR block. If the process is able to find a node in the search structure that matches the rule's CIDR block, the process proceeds to 1050. Otherwise, the process proceeds to 1045.

At 1045, the process adds or inserts a new node into the search structure that corresponds to the rule's CIDR block, since the search structure has no existing node that corresponds to it. In some embodiments, the process reorganizes the search structure so that the binary prefix structure of the tree can be maintained. In some embodiments, this reorganization requires adding stub nodes that do not correspond to any rules in the firewall, such as the node 706 and 707 in the search tree 700. After adding the new node for the CIDR block of the received rule, the process proceeds to 1050.

At 1050, the process associates the received rule with the node (either the newly added node from the operation 1045 or the located node from the operation 1040). The process then determines (at 1060) whether there are more qualified CIDR block in the received rule. If so, the process returns to 1020 to either locate an existing node in the search structure or to add a new node to the search structure for the other CIDR block in the rule. Otherwise, the process 1000 terminates, and the constructed search tree is updated and available for use for identification of relevant rules.

In some embodiments, the search structure as described in Section II is implemented at the network manager of the datacenter. The network manager constructs and updates the search structure for qualified rules in its firewall rule database. The search structure is then used to identify rules relevant to individual VMs, based on queries from individual hypervisors for those VMs or on the network manager's own record. The identified relevant rules are then delivered to the host machine of those VMs.

III. Computing Device

Figure 11:
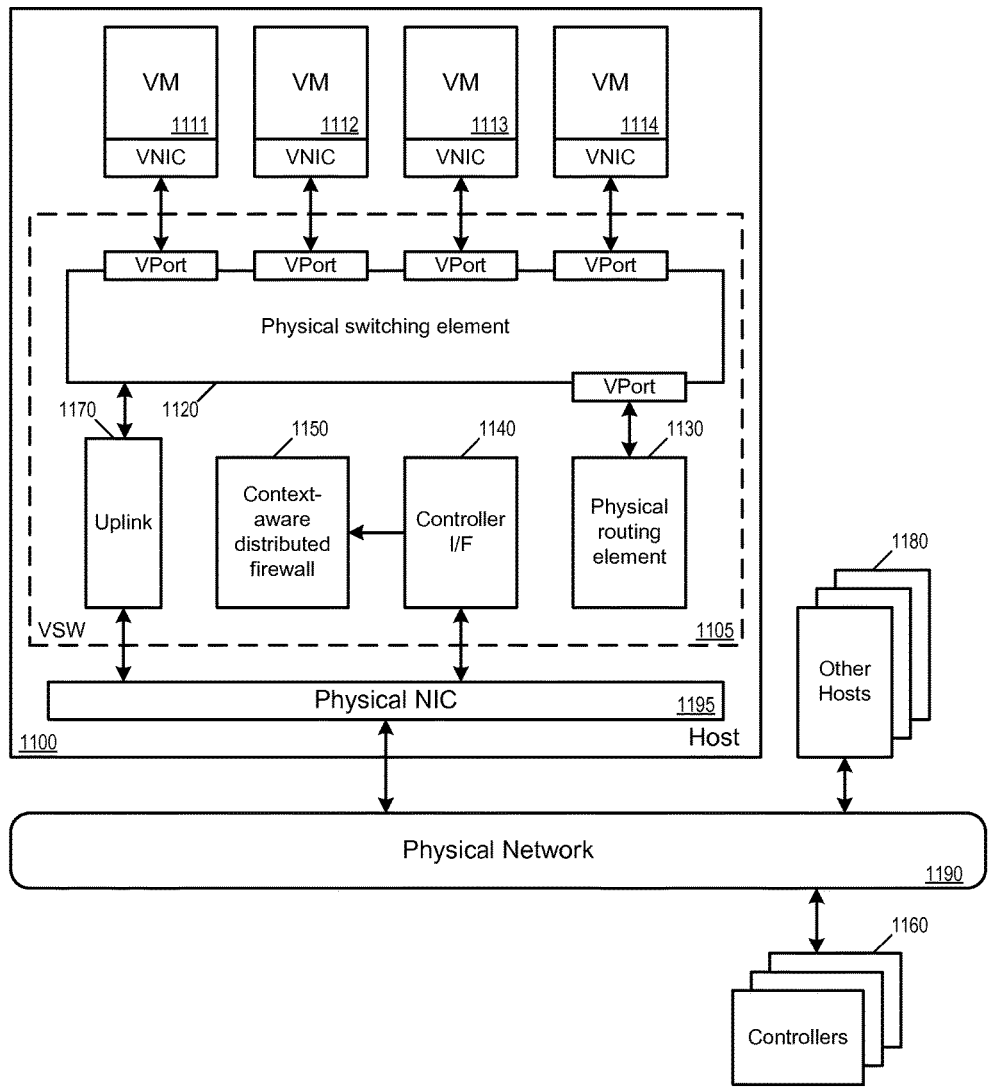
FIG. 11 illustrates an example host machine that is operating virtualization software for hosting virtual machines.

As mentioned earlier, some embodiments of the invention are implemented by virtualization software or hypervisors running on computing devices serving as host machines. For some embodiments, FIG. 11 illustrates an example host machine 1100 that is operating virtualization software 1105. The virtualization software 1105 allows the host machine to host virtual machines 1111-1114 as well as connecting the virtual machines to a physical network 1190. This physical network 1190 may span one or more datacenters and include various physical switches and routers.

As illustrated, the host machine 1100 has access to the physical network 1190 through a physical NIC (PNIC) 1195. The virtualization software 1105 serves as the interface between the hosted VMs 1111-1114 and the physical NIC 1195 (as well as other physical resources, such as processors and memory). Each of the VMs includes a virtual NIC (VNIC) for accessing the network through the virtualization software 1105. Each VNIC in a VM is responsible for exchanging packets between the VM and the virtualization software 1105. In some embodiments, the VNICs are software abstractions of physical NICs implemented by virtual NIC emulators. In some embodiments, the VNIC of a VM also includes a firewall filter for identifying relevant firewall rules and applying those firewall rules for filtering packets.

The virtualization software 1105 manages the operations of the VMs 1111-1114, and includes several components for managing the access of the VMs to the physical network (by implementing the logical networks to which the VMs connect, in some embodiments). As illustrated, the virtualization software 1105 includes a physical switching element 1120, a physical routing element 1130, a controller interface 1140, a context-aware distributed firewall module 1150, and an uplink module 1170.

The controller interface 1140 receives control plane messages from a controller or a cluster of controllers 1160. In some embodiments, these control plane message includes configuration data for configuring the various components of the virtualization software and/or the virtual machines (such as the physical switching element 1120 and the physical routing element 1130). In some embodiments, the control plane messages also include messages for firewall configurations, e.g., messages that include updates to the firewall rules stored at the host machine 1100.

The context-aware distributed firewall module 1150 receives the firewall rules update (or the firewall configuration messages) from the controller interface 1150. The context-aware distributed firewall module 1150 also builds a search structure based on the received firewall rules. The search structure is made accessible to the VMs (or their corresponding filters in their VNICs) so the relevant rules can be efficiently identified for performing firewall operations as described above in Sections I and II.

The physical switching element 1120 (or managed physical switching element, MPSE) delivers network data to and from the physical NIC 1195, which interfaces the physical network 1190. The physical switching element also includes a number of virtual ports (vPorts) that communicatively interconnects the physical NIC with the VMs 1111-1114, the physical routing element 1130 and the controller interface 1140. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 1190 (e.g., another VM running on another host).

The physical routing element 1130 (or managed physical routing element, MPRE) performs L3 routing (e.g., by performing L3 IP address to L2 MAC address resolution) on data packets received from a virtual port on the physical switching element 1120. In some embodiments, the virtual port that the physical routing element 1130 is attached to is a sink port. Each routed data packet is then sent back to the physical switching element 1120 to be forwarded to its destination according to the resolved L2 MAC address. This destination can be another VM connected to a virtual port on the physical switching element 1120, or a reachable L2 network element on the physical network 1190 (e.g., another VM running on another host, a physical non-virtualized machine, etc.).

The uplink module 1170 relays data between the physical switching element 1120 and the physical NIC 1195. In some embodiments, the uplink module 1170 allows the host machine 1100 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 1100 sends a data packet (e.g., an ethernet frame) to another VM in the same VXLAN network but on a different host, the uplink module 1170 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 1170 also decapsulates incoming VXLAN packets and forwards only the original inner data packet to the destination VM.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
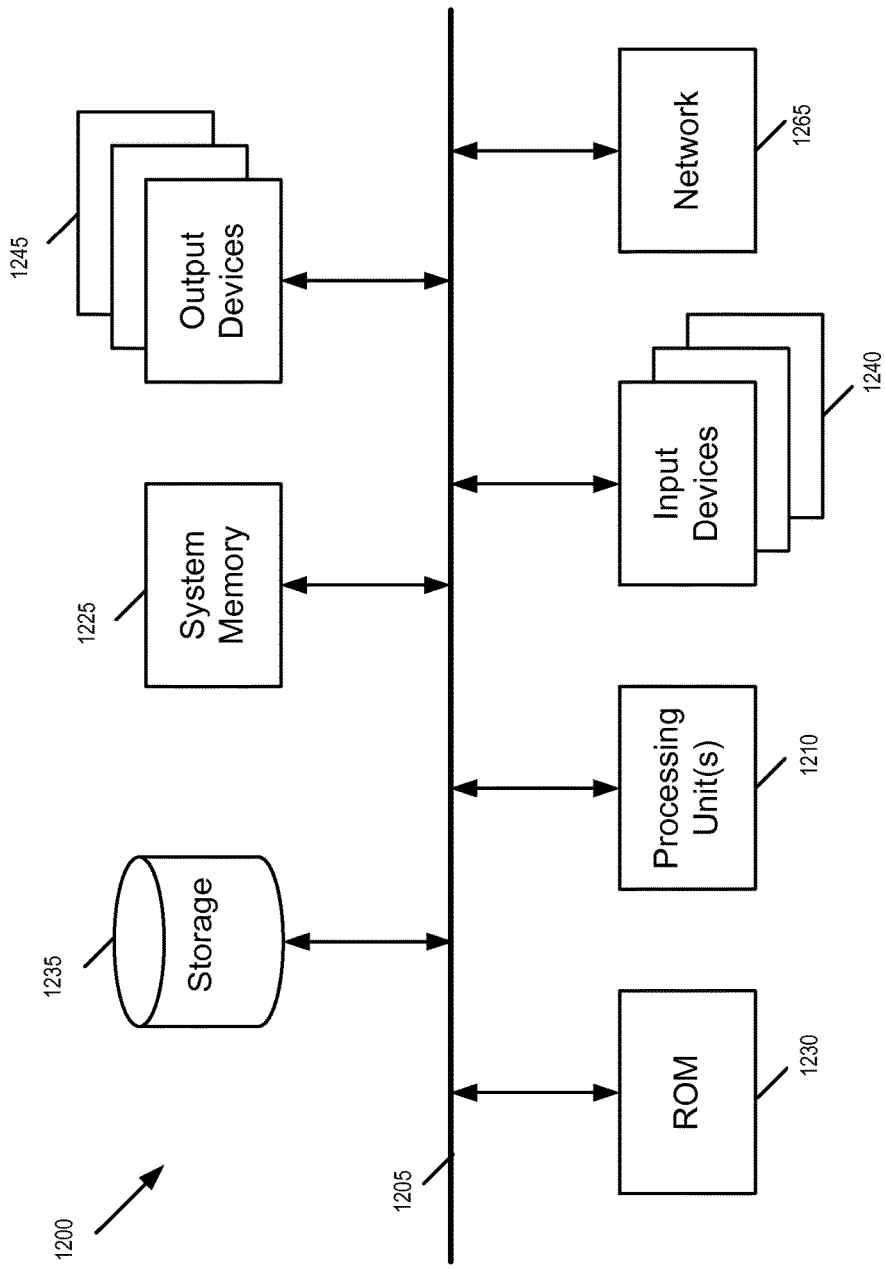
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 9, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A host machine operating in a datacenter and executing a plurality of data compute nodes (DCNs), the host machine comprising:
   a set of processing units; and
   a non-transitory machine readable medium storing a program for execution by at least one processing unit, the program comprising sets of instructions for:
   receiving, from a network manager computer, a plurality of sets of firewall rules corresponding to a plurality of DCNs executed by the host machine, wherein each set of firewall rules comprises firewall rules identified as relevant to a corresponding particular DCN in the plurality of DCNs, wherein the relevant rules for a particular DCN are identified by the network manager computer from a plurality of firewall rules for protecting a set of DCNs in the datacenter using a search tree structure, the relevant firewall rules for a particular DCN comprising firewall rules that specify either a source or destination address that matches an address of the particular DCN; and
   performing firewall operations on packets to or from each of the plurality of DCNs by examining the corresponding set of firewall rules.

2. The host machine of claim 1, wherein the program is part of a virtualization software running on the host machine for operating the plurality of DCNs.

3. The host machine of claim 1, wherein the relevant firewall rules for a particular DCN further comprise firewall rules that use a classless inter-domain routing (CIDR) block which includes the address of the particular DCN to specify either a source or destination address.

4. The host machine of claim 1, wherein the search tree structure comprises a first node corresponding to a classless inter-domain routing (CIDR) blocks and a second node corresponding to an internet protocol (IP) addresses.

5. The host machine of claim 4, wherein the network manager computer constructs the search tree structure by inserting or locating nodes corresponding to the plurality of firewall rules for protecting the set of DCNs in the datacenter.

6. The host machine of claim 5, wherein the search tree structure is a binary prefix tree.

7. The host machine of claim 6, wherein the network manager computer identifies the relevant rules for each particular DCN by traversing the prefix tree of firewall rules by traversing nodes according to a binary string of the particular IP address associated with the particular DCN.

8. The host machine of claim 7, wherein the network manager computer identifies the relevant firewall rules for each particular DCN by identifying the firewall rules associated with the traversed nodes as firewall rules that are applicable to the particular DCN.

9. A non-transitory machine readable medium storing a program for execution by at least one processing unit of a host machine executing a plurality of data compute nodes (DCNs), the program comprising sets of instructions for:
receiving, from a network manager computer, a plurality of sets of firewall rules corresponding to a plurality of DCNs executed by the host machine, wherein each set of firewall rules comprises firewall rules identified as relevant to a corresponding particular DCN in the plurality of DCNs, wherein the relevant rules for a particular DCN are identified by the network manager computer from a plurality of firewall rules for protecting a set of DCNs in the datacenter using a search tree structure, the relevant firewall rules for a particular DCN comprising firewall rules that specify either a source or destination address that matches an address of the particular DCN; and
performing firewall operations on packets to or from each of the plurality of DCNs by examining the corresponding set of firewall rules.

10. The non-transitory machine readable medium of claim 9, wherein the program is part of a virtualization software running on the host machine for operating the plurality of DCNs.

11. The non-transitory machine readable medium of claim 9, wherein the relevant firewall rules for a particular DCN further comprise firewall rules that use a classless inter-domain routing (CIDR) block which includes the address of the particular DCN to specify either a source or destination address.

12. The non-transitory machine readable medium of claim 9, wherein the search tree structure comprises a first node corresponding to a classless inter-domain routing (CIDR) block and a second node corresponding to an internet protocol (IP) address.

13. The non-transitory machine readable medium of claim 12, wherein the network manager computer constructs the search tree structure by inserting or locating nodes corresponding to the plurality of firewall rules for protecting the set of DCNs in the datacenter.

14. The non-transitory machine readable medium of claim 13, wherein the search tree structure is a binary prefix tree.

15. The non-transitory machine readable medium of claim 14, wherein the network manager computer identifies the relevant rules for each particular DCN by traversing the prefix tree of firewall rules by traversing nodes according to a binary string of the particular IP address associated with the particular DCN.

16. The non-transitory machine readable medium of claim 15, wherein the network manager computer identifies the relevant firewall rules for each particular DCN by identifying the firewall rules associated with the traversed nodes as firewall rules that are applicable to the particular DCN.

* * * * *